United States Patent [19]

Adams

[11] Patent Number: 5,295,512

[45] Date of Patent: Mar. 22, 1994

[54] FLUID CONTROL SPOOL VALVE

[75] Inventor: Madison B. Adams, Jacksonville, Fla.

[73] Assignee: M. B. Adams and Associates, Inc., Jacksonville, Fla.

[21] Appl. No.: 840,021

[22] Filed: Feb. 24, 1992

[51] Int. Cl.⁵ .................... F15B 13/02; F15B 13/14
[52] U.S. Cl. .................... 137/625.69; 91/434; 251/900
[58] Field of Search ............... 91/434; 137/625.69; 251/900

[56] References Cited

U.S. PATENT DOCUMENTS

| | | | |
|---|---|---|---|
| 2,899,939 | 8/1959 | Norris | 137/625.69 |
| 2,979,080 | 4/1961 | Hewitt | 137/625.69 X |
| 2,997,065 | 8/1961 | Johnson | 137/625.69 |
| 3,043,331 | 7/1962 | Peters | 137/625.69 X |
| 3,140,728 | 7/1964 | Webb | 137/625.69 |
| 3,316,031 | 4/1967 | Henry-Biabaud | 91/434 X |
| 3,706,322 | 12/1972 | Carlson | 91/433 X |
| 3,807,441 | 4/1974 | Grosseau | 137/625.65 X |

FOREIGN PATENT DOCUMENTS 2221238  11/1973  Fed. Rep. of Germany .......... 137/625.69

*Primary Examiner*—Gerald A. Michalsky
*Attorney, Agent, or Firm*—Arthur G. Yeager

[57] ABSTRACT

Spool valve for fluid systems, the valve having a slidable spool in a bore in a valve block having three ports spaced aially along the bore for control of fluid flow, the spool having three spaced O-ring seals to correspond with the ports and having a reduced diameter portion between two of the O-ring seals, and a pressure-equalizing conduit connecting one end of the spool with the outlet port of the valve. Small lands of substantially equal diameter to the spool adjacent the reduced diameter portion before the two O-ring seals provides restricted or throttled fluid flow prior to increased fluid flow via reduced diameter portion.

13 Claims, 1 Drawing Sheet

FLUID CONTROL SPOOL VALVE

BACKGROUND OF THE INVENTION

Power transmission systems using gas or liquids under pressure to operate valves, levers, etc. need precisely operating valves to control the pressurized fluid. A typical example is the clutch operation mechanism of a highway truck. The foot pedal is depressed by the driver when disengaging the clutch in order to shift gears, and in modern trucks this operation is usually accomplished by providing a booster or power assisting mechanism to provide the substantial force necessary to operate the clutch while requiring only a small part of that force to come from the driver's foot. The booster or power assisting mechanisms usually employ high pressure air or oil controller by flowing through throttling valves that open and close so as to prevent any sudden surges or cut-offs of the high pressure fluid. Such valves are useful in almost any type of fluid operated equipment. In the prior art it is known generally to employ spool valves for this service, as shown in U.S. Pat. Nos. 3,511,276; 3,542,075; and 3,554,235. The present invention relates to an improved spool valve of the same general type as these.

It is an object of this invention to provide an improved spool valve for use with high pressure fluids. It is another object of this invention to provide an improved spool valve that provides good throttling capabilities. It is still another object of this invention to provide an improved spool valve with surge dampening characteristics. Still other objects will become apparent from the more detailed description which follows.

BRIEF SUMMARY OF THE INVENTION

This invention relates to a fluid control spool valve having a valve block with a valve spool bore extending through the block, a valve stem slidable lengthwise in the bore; an upper inlet port, a central outlet port, and a lower exhaust port wherein each of such ports includes a conduit extending from the bore to the outside of the valve block, the valve spool having a lengthwise portion of reduced diameter to provide fluid communication between two or the three ports at selected axial positions of the spool. The spool has three spaced O-ring seals to prevent leakage of fluid between the bore and the spool and to selectively direct flow of fluid between two of the ports.

In specific and preferred embodiments of this invention the spool is biased toward the closed position by a spring and by the operating fluid at the same pressure as that in the outlet port at that time. In another specific preferred embodiment, the spool surface decreases or drops from its full diameter to its reduced diameter at each end of its reduced diameter portion to permit a smooth throttling effect by small lands of full diameter when the spool is moved axially past a port.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
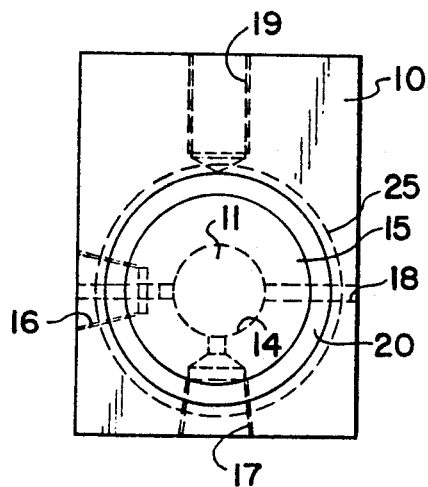
FIG. 1 is a top plan view of the valve of this invention.

The features of this invention are best understood by reference to the attached drawings. A valve block 10 has a throughbore 14 in which a spool 11 slides axially with close tolerances between the bore 14 and the spool 11. Lower end 12 of spool 11 is attached to levers or other mechanism for manually moving spool 11 axially within bore 14. Upper end 13 of spool 11 is attached to spool cap 26 by welding or other rigid attachment (i.e., by a bolt—not shown—through hole 28) causing cap 26 to move with spool 11. Spool cap 26 has an outwardly directed flange 27 to fit within a counterbore portion 15 at the upper end of bore 11. The juncture between counterbore 15 and bore 11 produces a first ledge 37 which is overlapped by flange 27 of cap 26 so as to prevent spool 11 from moving downwardly beyond the position when flange 27 rests against the first ledge 37 at the bottom of counterbore portion 15.

Figure 2:
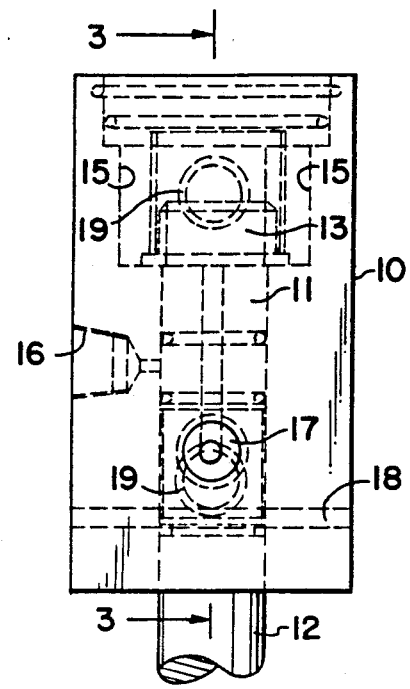
FIG. 2 is a front elevational view of the valve of this invention.
Figure 3:
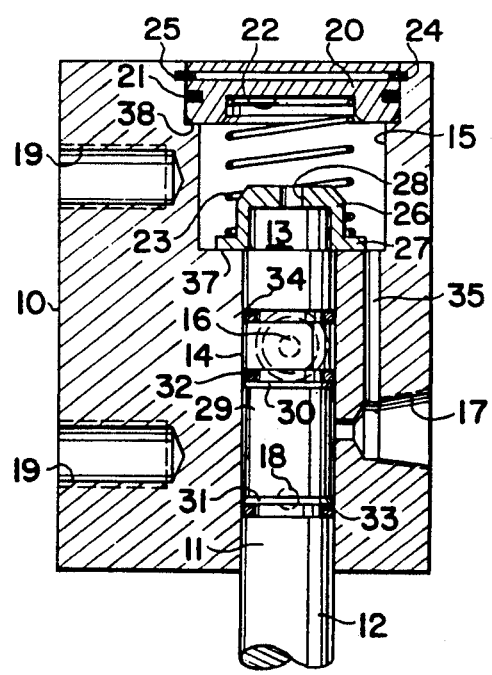
FIG. 3 is a cross sectional view taken at 3—3 of FIG. 2.
Figure 4:
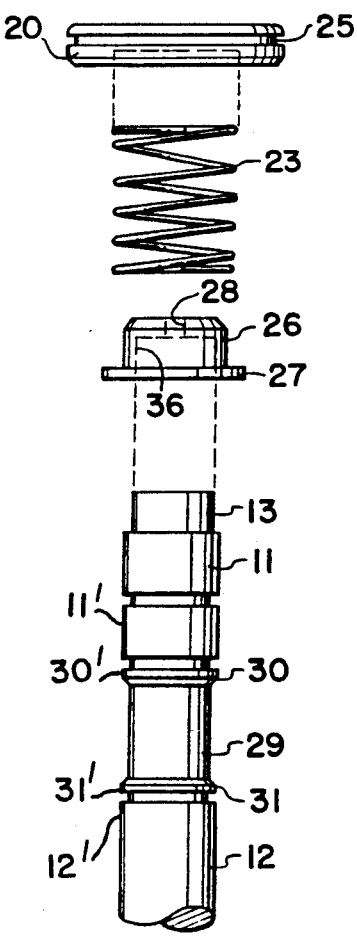
FIG. 4 is an exploded elevational view of the spool, spool cap, spring, and cover of this invention.

The upper end of counterbore portion 15 is closed by a removable cover 20 which, when closed as shown in FIGS. 2 and 3, rests against second ledge 38 in counterbore portion 15. Cover 20 is held firmly in its closed position by a split retainer ring 24 seated in groove 25. Cover 20 also has a circumferential groove for seating O-ring seal 21 to prevent fluid leakage from inside counterbore 15 to the atmosphere around valve block 10.

Valve block 10 has three ports for directing the flow of fluid therethrough, Inlet port 16 leads fluid into the valve and it is located the farthest upward (toward upper end 13) in the valve block 10 and extending inward to bore 14. Outlet port 17 is located generally medially of bore 14 and spaced downwardly from inlet port 16. Each of inlet port 16 and output port 17 is tapped to receive a conduit (metal pipe or flexible rubber tubing) to carry the fluid into valve block 10 and away from valve block 10 to provide an operational force whenever it is desired to operate mechanical equipment. The third port is an exhaust port 18 spaced below outlet port 17 and generally adjacent lower end 12 of spool 11, Extending above and below outlet port 17, when the valve is in its closed position, is a portion 29 of valve spool 11 that has a reduced diameter. Above and below portion 29 of the spool 11 has a diameter that is as close as possible to the diameter of bore 14 so as to permit easy sliding of spool 11 up and down in bore 14 and at the same time to provide some obstruction to fluid flow between spool 11 and bore 14. The amount of diameter reduction is that which is sufficient to provide free fluid flow around spool 11 at that location when the spool 11 is at maximum opening. For example, the full diameter of spool 11 may be 0.25 to 0.50 while the reduced diameter portion may be 0.01 to 0.10 inch less in diameter. Positive sealing around ports 16 and 18 and at both ends of reduced diameter portion 29 is provided by three O-ring seals seated in three grooves in spool 11. The uppermost O-ring seals 34 and 32 are closely adjacent to inlet port 16 and located above and below port 16, respectively, to prevent leakage from inlet port 16 in any direction. The lower of these two O-rings is O-ring 32 and it is located closely adjacent to and above the upper end of reduced diameter portion 29. The third O-ring is O-ring 33 which is located closely adjacent to and below the lower end of reduced portion 29. When the valve is in the closed position shown in FIG. 3, inlet port 16 is sealed off from admitting any fluid by the presence of O-rings 32 and 33, and reduced portion 29 is sealed off from the passage of any fluid beyond O-rings 32 and 33. In this closed position no fluid can flow from inlet port 16 to outlet port 17, while fluid can flow out exhaust port 18 to release any pressure in reduced diameter portion 29. When it is desired to open the valve, spool 11 is moved upwardly until O-ring 33 seals above exhaust 18 and O-ring 32 is above inlet portion 16, permitting reduced diameter portion to extend from inlet port 16 to outlet port 17, and thereby to permit free flow of fluid therebetween. When the valve is closed, spool 11 moves downwardly until O-ring 32 moves below inlet port 16 leaving outlet port 17 open to reduced diameter portion 29, while inlet port 16 is closed to that portion 29. The valve stem or spool 11 permits O-ring 32 to close inlet port 16 while exhaust port 18 remains closed by O-ring 33. By further movement of spool 11 downwardly fluid begins slowly passing from outlet port 17 to exhaust 18 after passage of O-ring 33 beyond exhaust 18. Such fluid passage is restricted or throttled by small land 31', which may be about 0.0050 inches along the lengthwise axis of spool 11, but may be varied depending on the prospective use of the valve. Land 31' is of equal diameter to the full diameter of the spool portion 12'. Similarly, land 30' restricts or throttles the fluid flow when the spool 11 is moved to uncover inlet port 16 for fluid to flow to outlet port 17. Land 30', having substantially the same diameter as spool portion 11', may be about 0.0100 inches along the lengthwise axis of spool 11 which is about twice as wide as land 31' due to the pressure of the fluid from inlet port 16 to outlet port 17 compared to the pressure of the fluid from outlet port 17 to exhaust port 18 in the valve as disclosed herein. In other uses of the valve, according to this invention such land 30' and 31' may be equal in length depending on the fluid pressures involved, etc. After such throttling effect by land 31', continued downward movement of spool 11 eventually uncovers exhaust port 18 and permits any residual fluid in reduced diameter portion 29 to be exhausted from the valve to atmosphere or a reservoir of the fluid for rinse or to a water disposal.

There is a throttling effect when spool 11 is moved to open or close inlet port 16. The upper and lower ends 30 and 31 of reduced portion 29 is decreased at the juncture of the full diameter of spool 11 with the reduced diameter of portion 29 and such decrease may be by taper if desired. With movement of spool 11 in opening or closing inlet port 16, there is no sudden expansion or reduction in space for fluid flow due to the presence of land 30', and thereby there is no surge of high pressure nor any sudden stoppage which would otherwise produce erratic and irregular transpositions from high pressure flow to no flow or vice versa.

Another feature which helps to provide smooth changes in fluid flow is the presence of equalizer channel 35 connecting outlet port 17 to counterbore portion 15. This feature provides a counterforce to the movement of spool when the valve is being opened. This causes valve spool 11 to move upwardly only in response to a positive force, which in turn helps to prevent sudden surging. Similarly there is an opposite effect as the valve spool is moved toward closing and exhausting. When used in a power clutch assembly this provides a better "feel" to the operator of the truck.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A fluid control spool valve comprising a valve block having a valve spool bore extending through said block, a valve stem slidable lengthwise in said bore and having an upper cylindrical inlet port, a central cylindrical outlet port, and a lower cylindrical exhaust port wherein each of said ports has predetermined cross-sectional dimensions and includes a conduit extending from said bore outwardly of said valve block, said valve spool having a lengthwise portion of reduced diameter to provide fluid communication between two of said three ports at selected axial positions of said spool, said spool having three spaced O-ring seals mounted thereon to prevent leakage of said fluid between said bore and said spool and to selectively direct flow of said fluid between two of said ports, means to equalize fluid pressure in said outlet port with fluid pressure exerted axially on said spool tending to move said spool to a closed position with no fluid flow between said inlet and outlet ports, said means to equalize including a conduit within said valve block and communicating said outlet port with a drop of said spool being generally perpendicular to its lengthwise axis, said spool portion of reduced diameter being a right cylindrical shape having an upper end adjacent said inlet port and a lower end adjacent said exhaust port with two of said O-ring seals spaced, respectively, above and below said outlet port and associated with respective said inlet and exhaust ports, means for throttling the fluid as said spool moves axially with respect to said inlet and exhaust ports during initial opening and closing thereof, said means for throttling including small lands of predetermined lengths less than the cross-sectional dimensions of respective said inlet and exhaust ports.

2. The valve of claim 1 wherein said valve block includes an enlarged counterbore portion at one end of said bore, a removable cap to close said counterbore portion, said conduit connecting said counterbore portion with said outlet port.

3. The valve of claim 1 which additionally comprises a spring, said valve spool having a lower end connected to eternal control means adapted to move said spool slidably to selected positions within said bore, and said valve spool having an upper end engaged with said spring internally of said valve block to move said spool toward said lower end.

4. The valve of claim 3 wherein said valve block includes a counterbore portion at said upper end and having a lower surface, a removable block cap to close said counterbore portion to the atmosphere, a spool cap attached to said stem, said cap having a flange for engagement with said lower surface of said counterbore for stopping movement of said spool toward said lower end at a selected position and for providing a seat for said spring.

5. A spool valve for controlling the flow of fluid therethrough comprising a valve block with a bore extending therethrough with a counterbore portion at one end thereof and with an upper cylindrical inlet port, a central cylindrical outlet port, and a lower cylindrical exhaust port spaced apart axially along said bore and communicating said bore with the outside of said valve block, said ports having predetermined cross-sectional dimensions, said valve including an elongated spool slidable axially within said bore with close tolerances therebetween, said spool having an upper free end and a lower end with said lower end being attached to elements for manually controlling the movement of said spool in said valve block, and said free end being located within the confines of said valve block and adjacent said counterbore portion, a removable cover for closing said counterbore portion to the outside atmosphere, said spool having a right cylindrical portion of a length of a reduced diameter, an upper end, a lower end, an O-ring seal carried by said spool and spaced axially away from, but closely adjacent to respective said upper end and lower end of said spool, and a third O-ring seal positioned between said inlet port and said outlet port and adjacent to said inlet port, said valve block including means to equalize the pressure in said outlet port with the pressure in said counterbore portion, and a compression spring located in said counterbore portion to bias said spool to move to a closed position when no fluid flow between said inlet and outlet ports is permitted, and means for throttling the fluid as said spool moves axially with respect to said inlet and exhaust ports, said means for throttling including small lands of a predetermined length less than the cross sectional dimensions of said inlet and outlet ports and of a diameter substantially equal to the spool diameter being located closely adjacent to upper and lower ends of said lengthwise portion of reduced diameter to provide a controlled throttling action on fluid during spool movement axially during initial opening and closed of said inlet and exhaust ports.

6. The valve of claim 5 wherein said spool at said free end is attached to a cap with an outwardly projecting lateral flange to stop movement of said spool downwardly when said flange contacts the bottom of said counterbore portion, said cap and said flange providing a seat for a helical coil spring extending between said flange and the inside of said removable cover.

7. The valve of claim 5 wherein said means to equalize comprises a conduit connecting and outlet port with said counterbore portion.

8. A fluid control spool valve comprising a valve block with an elongated valve spool bore extending through said block, an elongated stem slidable lengthwise in said bore, said valve block further including an upper cylindrical inlet port, a central cylindrical outlet port, and a lower cylindrical exhaust port with a first, second and third passageway communicating between said bore and outside of said valve block, said ports having predetermined cross-sectional dimensions, said valve spool having a lengthwise portion of reduced diameter to provide fluid communication between two of said three ports at selected axial positions of said spool within said bore, said spool having three spaced O-ring seals carried by said spool to prevent leakage of fluid between said two of said three ports, means to equalize fluid pressure in said outlet port with such pressure being exerted axially on said spool and to move said spool to a closed position, and spring means biased to maintain said spool in a closed position, means for throttling the fluid as said spool moves axially with respect to said inlet and exhaust ports, said means for throttling including small lands of a predetermined length less than the cross sectional dimensions of said inlet and outlet ports and of a diameter substantially equal to the spool diameter being located closely adjacent to upper and lower ends of said lengthwise portion of reduced diameter to provide a controlled throttling action on fluid during spool movement axially during initial opening and closing of said inlet and exhaust ports.

9. The valve of claim 8 wherein said means to equalize fluid pressure includes a fourth passageway communicating between said outlet port and a fall of said spool generally perpendicular to its lengthwise axis.

10. The valve of claim 9 wherein said valve block includes an enlarged counterbore portion at one end of said bore, a removable cap to close said counterbore, said fourth passageway communicates between said counterbore portion and said outlet port.

11. The valve of claim 10 wherein said spool has an upper free end, a cap attached to said free end with an outwardly projecting lateral flange adapted to sop movement of said spool downwardly when said flange contacts said counterbore portion, said spring means including a helical coil spring about said cap and having opposite end portions respectively engaged with said removable cap.

12. The valve of claim 8 wherein said valve spool has an upper end and a lower end, control means connected externally of said valve body for slidably moving said spool to selected positions within said bore, said upper end of said spool being biased by said spring means to move said spool toward said lower end.

13. The valve of claim 12 wherein said valve block includes a counterbore portion at said upper end, a removable block cap disposed in said counterbore portion to the atmosphere, a flange spool cap attached to said upper end of said spool for restricting movement of said spool toward said lower end at a selected position and to provide a seat for said spring means.

* * * * *